US011003720B1

(12) United States Patent
Xia et al.

(10) Patent No.: US 11,003,720 B1
(45) Date of Patent: May 11, 2021

(54) RELEVANCE-ORDERED MESSAGE SEARCH

(71) Applicant: Twitter, Inc., San Francisco, CA (US)

(72) Inventors: Yan Xia, San Francisco, CA (US); Tian Wang, San Francisco, CA (US); Juan Manual Caicedo Carvajal, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 315 days.

(21) Appl. No.: 15/836,775

(22) Filed: Dec. 8, 2017

Related U.S. Application Data (60) Provisional application No. 62/431,801, filed on Dec. 8, 2016.

(51) Int. Cl.
| | |
|---|---|
| *G06F 16/903* | (2019.01) |
| *G06F 16/9038* | (2019.01) |
| *G06N 20/00* | (2019.01) |
| *G06F 16/13* | (2019.01) |
| *G06F 16/22* | (2019.01) |

(52) U.S. Cl.
CPC ...... *G06F 16/90344* (2019.01); *G06F 16/134* (2019.01); *G06F 16/22* (2019.01); *G06F 16/9038* (2019.01); *G06N 20/00* (2019.01)

(58) Field of Classification Search
CPC .......... G06F 16/90344; G06F 16/9038; G06F 16/134; G06F 16/22; G06N 20/00
USPC ................................................ 707/723, 741
See application file for complete search history.

(56) References Cited

U.S. PATENT DOCUMENTS

| | | | | |
|---|---|---|---|---|
| 10,275,418 | B2 * | 4/2019 | Aleskerov | ................ G06N 5/02 |
| 2013/0218896 | A1 * | 8/2013 | Palay | ...................... G06F 16/22 |
| | | | | 707/741 |
| 2014/0250115 | A1 * | 9/2014 | Yang | ..................... G06F 16/583 |
| | | | | 707/728 |
| 2016/0132787 | A1 * | 5/2016 | Drevo | ................... G06N 20/00 |
| | | | | 706/12 |

(Continued)

OTHER PUBLICATIONS

Chen et al., "Efficient Cost-Aware Cascade Ranking in Multi-Stage Retrieval," Proceedings of the 40th International Association for Computing Machinery (ACM) Special Interest Group on Information Retrieval (SIGIR) Conference on Research and Development in Information Retrieval, Aug. 7-11, 2017, pp. 445-454.*

(Continued)

*Primary Examiner* — Shahid A Alam
(74) *Attorney, Agent, or Firm* — Fish & Richardson P.C.

(57) ABSTRACT

Methods, systems, and apparatus, including computer programs encoded on computer storage media, for information retrieval. One of the methods includes receiving a search query from a user device at a messaging system; determining one or more relevant messages responsive to the search query, the determining comprising: processing the search query using a first stage of a ranking system, the first stage using a first set of features to identify a first set of relevant message, processing the search query using a second stage of the ranking system, the second stage using a second set of features and the first set of relevant messages to determine a second set of relevant messages, and ranking the second set of relevant messages according to respective scores; and providing one or more results to the user device for display as search results.

24 Claims, 7 Drawing Sheets

(56) References Cited

U.S. PATENT DOCUMENTS

2016/0224672 A1* 8/2016 Bindal .............. G06F 16/24578
2018/0101617 A1* 4/2018 Govindarajan ......... H04L 67/02
2018/0268065 A1* 9/2018 Parepally ............. G06K 9/6296

OTHER PUBLICATIONS

Radlinski et al., "Learning Diverse Rankings with Multi-Armed Bandits," Proceedings of the 25th International Conference on Machine Learning, Jul. 5-9, 2008, pp. 784-791 (Year: 2008).*
Radlinski et al., "Learning Diverse Rankings with Multi-Armed Bandits," Proceedings of the 25th International Conference on Machine Learning, Jul. 5-9, 2008, pp. 784-791.

* cited by examiner

RELEVANCE-ORDERED MESSAGE SEARCH

CROSS-REFERENCE TO RELATED APPLICATIONS

This application claims the benefit under 35 U.S.C. § 119(e) of U.S. Patent Application No. 62/431,801, entitled "Relevance-Ordered Presentation of Search Results in Messaging Platforms," filed Dec. 8, 2016, which is incorporated herein by reference in its entirety.

BACKGROUND

This specification relates to information retrieval. Conventional search systems seek to identify, in response to a received query, data that is responsive to the search query. For example, in a messaging system, a user can submit a query seeking messages relevant to particular query terms. Typically, the messaging system returns results responsive to the query in reverse chronological order based on a time at which the respective messages were authored on the messaging system.

SUMMARY

This specification describes technologies relating to ranking search results. Responsive to a received search query, a multi-stage ranking system can be used to identify relevant search results. The different stages allow the system to successively narrow a set of responsive results based on different scoring criteria. In particular, models at each stage can have increasing complexity without detrimental latency issues because they are being used on a smaller set of candidate results output from an earlier stage. A set of results are selected based on the final rankings generated by the multi-stage ranking system and provided for presentation to a client device according to particular presentation criteria.

In general, one innovative aspect of the subject matter described in this specification can be embodied in methods that include the actions of receiving a search query from a user device at a messaging system; determining one or more relevant messages responsive to the search query, the determining including: processing the search query using a first stage of a ranking system, the first stage using a first set of features to identify a first set of relevant message, each message of the first set of relevant messages having a score generated by the first stage that satisfies a threshold value, processing the search query using a second stage of the ranking system, the second stage using a second set of features and the first set of relevant messages to determine a second set of relevant messages, each message of the second set of relevant messages having a score generated by the second stage that satisfies a threshold value, and ranking the second set of relevant messages according to the respective scores; and providing one or more results to the user device for display as search results.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Processing the search query using the second stage includes serially processing the search query using a first sub-stage and a second sub-stage. The first sub-stage is a neural network model using an expanded set of features as compared to the first stage. The second sub-stage is a neural network model using text embeddings as added features. The second stage further includes a third sub-stage, the third sub-stage modifying the scores of the second set of relevant messages based on a determination of whether the context of the message text of the relevant messages matches the context of the terms of the search query. The first stage includes one or more distinct logistic regression models each trained to identify messages responsive to the query based on a particular engagement objective. The second stage introduces one or more features not used in the first stage. Each feature shares a particular feature schema allowing features of one model to be added to another model. One or more scores of the ranked second set of relevant messages are adjusted based on specified presentation parameters.

Particular embodiments of the subject matter described in this specification can be implemented so as to realize one or more of the following advantages. Search results can be presented in relevance order instead of reverse chronological order. Search result accuracy can be improved by using multiple relevance models. Performance can be improved by limiting more complex models and features to a smaller set of messages output from simpler models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
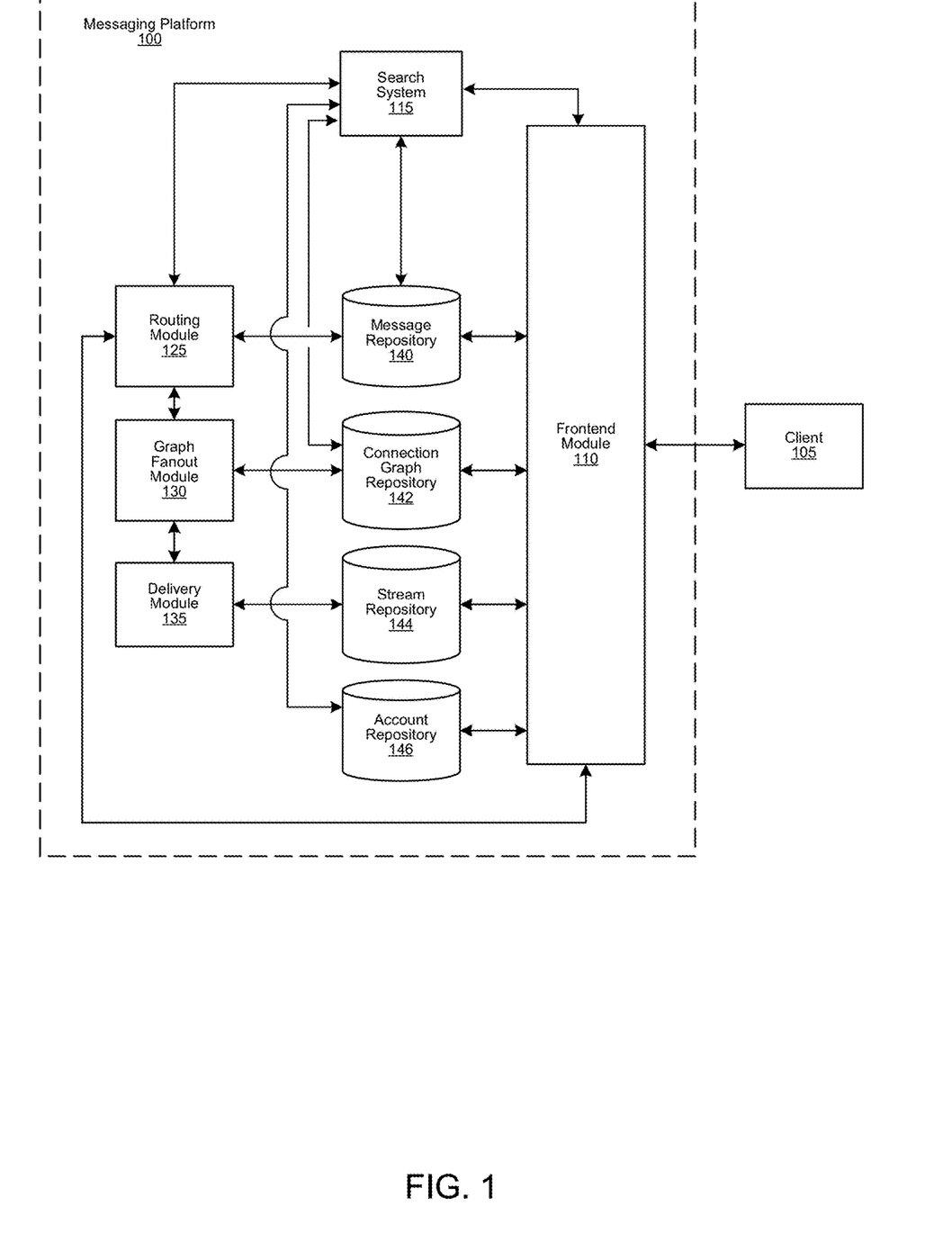
FIG. 1 is a block diagram of an example messaging platform.

FIG. 1 is a block diagram of an example messaging platform 100 communicatively coupled with a client 105. The messaging platform 100 has multiple components including a frontend module 110 with an application programming interface (API) (112), a search system 115, a routing module 125, a graph fanout module 130, a delivery module 135, a message repository 140, a connection graph repository 142, a stream repository 144, and an account repository 146.

Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given implementation.

In one or more implementations, the messaging platform 100 is a platform for facilitating real-time communication between one or more entities. For example, the messaging platform 100 can store millions of accounts of individuals, businesses, and/or other entities (e.g., pseudonym accounts, novelty accounts, etc.), e.g., using account repository 146. One or more users of each account may use the messaging platform 100 to send messages to other accounts inside and/or outside of the messaging platform 100. In some implementations, the messaging platform 100 can be configured to enable users to communicate in "real-time", i.e., to converse with other users with a minimal delay and to conduct a conversation with one or more other users during simultaneous sessions.

The messaging platform 100 can allow a user to broadcast messages and can display the messages to one or more other users within a reasonable time frame so as to facilitate a live or near-live conversation between the users. Recipients of a message may have a predefined graph relationship with an account of the user broadcasting the message, represented, for example, in connection graph repository 142. In one or more embodiments of the invention, the user is not an account holder or is not logged in to an account of the messaging platform 100. In this case, the messaging platform 100 can be configured to allow the user to broadcast messages and/or to use other functionality of the messaging platform 100 by associating the user with a temporary account or identifier.

The search system 115 includes functionality to receive a search query including one or more search terms. The search query can be generated by the frontend module 110 in response to a search request received from the client 105 and then sent to the search system 115. The search terms can be part of a search string (e.g., a regular expression) or other grouping of terms and can include one or more user entered search terms and/or one or more filter flags for filtering or otherwise restricting the requested search, in accordance with various implementations. Examples of a filter flag may include, but are not limited to, an exclude antisocial flag, an exclude spam flag, an exclude native reposts flag, a top messages flag, an image request flag, a video request flag, and a news request flag. The filter flag can be generated and included in an application programming interface (API) call made by the client 105 or can be added to the request by the frontend module 110 based on a type and/or source of the request.

The search system 115 uses the search query to identify content responsive to the query. For example, in response to a particular query, the search system 115 can determine one or more messages of the messaging platform 100 that are relevant to the query. In particular, the search system 115 can perform a search of the message repository 140 for messages satisfying particular search criteria. These messages can be ranked using a ranking system as described in this specification. The resulting message set is used to provide one or more messages to the client 105, e.g., based on the ranking, to the frontend module 110. The frontend module 110 then provides the message set to the client 105 for presentation on a display. Additionally, the search system 115 can determine one or more accounts of the messaging platform 100 that are relevant to the query. In particular, the search system 115 can perform a search of the account repository 146 for accounts satisfying particular search criteria.

In some implementations, the search system uses one or more partitions to identify particular messages in the message repository. Each partition can be configured to search for messages based on the search terms. In addition, the search system 115 can be configured to receive the search request including a search term and/or a facet category, and send the search request to the partitions for parallel searching. The search system 115 can be configured to receive a set of result sets from the partitions and generate a final result set.

Figure 2:
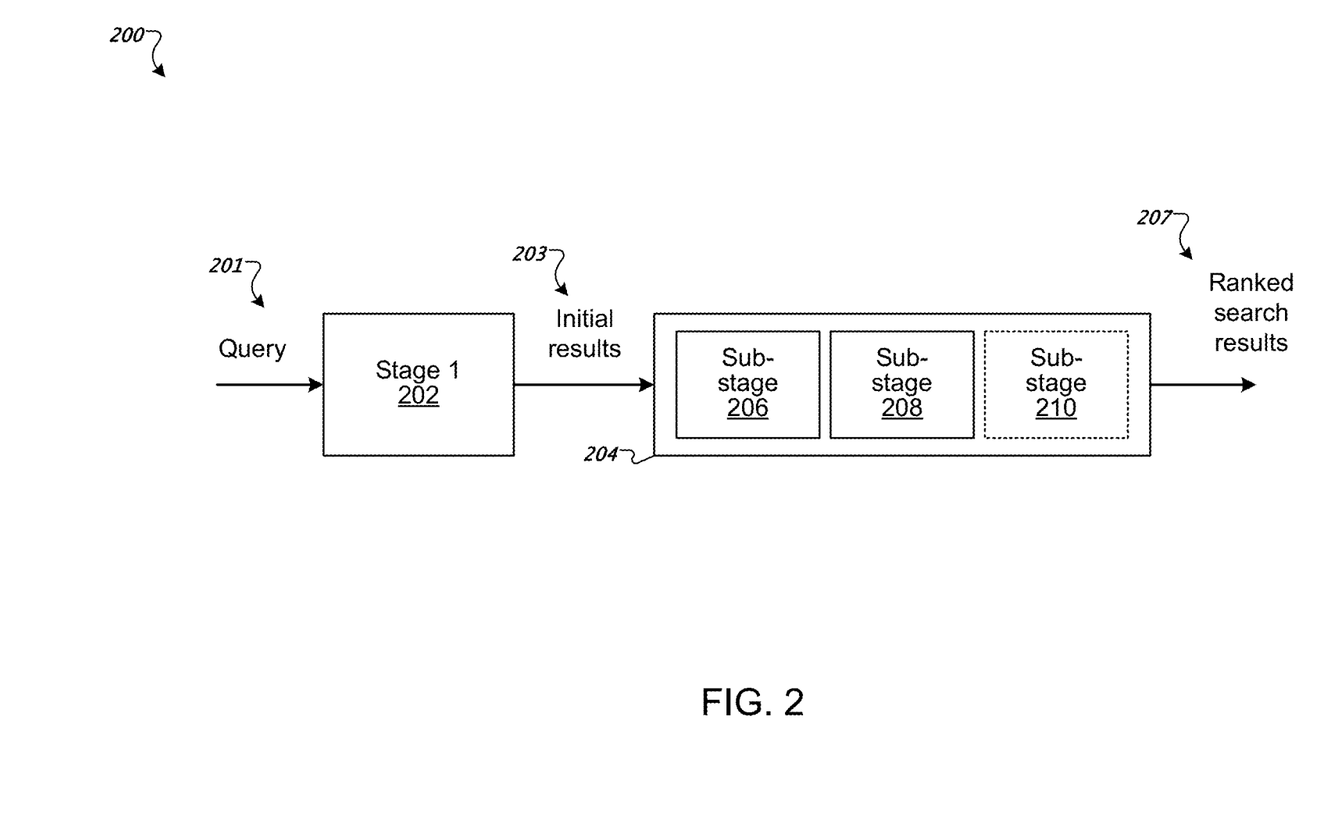
FIG. 2 is a block diagram of an example multi-stage ranking system.

FIG. 2 is a block diagram of an example multi-stage ranking system 200. The ranking system 200 receives a search query 201 as input and provides a set of ranked search results 207 as output.

The ranking system 200 is a multi-stage machine-learned ranking system. The ranking system 200 includes multiple layers of machine learning models, each trained on a different set of features, which can increase in number and complexity through the stages. As the search progresses through the stages, the ranking system 200 grows more sophisticated owing to the different features and is also processing a decreasing number of messages. This architecture allows for the processing of larger numbers of messages at the initial stage using simpler lower latency models while using more sophisticated models at the later stages of the ranking system 200.

Specifically, the ranking system 200 includes a first stage 202 and a second stage 204. The first stage 202 applies a search query 201 to a full-text index of messages. Consequently, a lot of messages must be scored in a short period of time. The second stage 204 can process the search using more relaxed latency requirements because the output 203 of the first stage 202 is a much smaller number of messages. This allows the second stage 204 to use more features having higher computational costs as well as more complex machine learning models.

Upon receipt, the search query 201 is processed by the first stage 202 of the ranking system 200. The first stage 201 retrieves messages from a full index of messages, e.g., the message repository 140 of FIG. 1. For example, the first stage 201 can retrieve messages having one or more terms of the query up to a specified cap of messages. The messages can be retrieved in reverse chronological order from the most recently indexed messages. For example, in some implementations 10,000 to 20,000 messages are initially retrieved from the full index.

The first stage 202 applies one or more models to the retrieved messages. In some implementations, each of the one or more models is a logistic regression model that provides fast processing of the large number of messages. Each logistic regression model is a regression model where the dependent variable is categorical. Thus, for example, when examining messages for a particular type of engagement, the dependent variable represents the engagement and the output decision is whether or not the engagement is likely to occur. The prediction of engagement is determined by a model trained using a set of features from a training data set.

The one or more models can each be trained for a different engagement objective. In particular, each model can be trained to score a message as relevant based on a likelihood that it will result in a particular engagement by a user that submitted the search query. The particular engagement can be one specific user interaction with the message or a combination of user interactions. For example, engagements with messages of the message platform can include rebroadcasting the message, e.g., a retweet, replying to the message, liking the message, quoting the message, or selecting content of the message, e.g., video or image content. In some cases, an engagement can be based on the length of time the user views the message, e.g., in seconds. Furthermore, the engagement can be any suitable combination of the above described engagements.

Training the one or more models for a particular engagement objective is described in more detail below with respect to FIG. 5. In some implementations, the first stage 202 includes a first logistic regression model that scores messages based on a likelihood that the user will reply to the message when presented in the search results and a second logistic regression model that scores messages based on a likelihood that the user will select content of the message when presented in the search results.

In some implementations, the first stage 202 applies a linear combination of two or more models to the retrieved messages, each of the two or more models trained for a different engagement goal. Thus, the final score for a message can be based on the scoring for the linear combination of models. In addition to providing the scored messages, the output of the first stage 202 can also include a feature vector identifying the features used to score the messages using the one or more models.

The scored results of the first stage 203 are provided as input to a second stage 204 of the ranking system 200. In particular, a specific number of highest scoring message are provided as output results, narrowing down the initial set of input messages for further processing by the second stage 204. For example, in some instances the initial retrieved messages, e.g., 16,000 messages, can be trimmed to an output of a few hundred messages, e.g., 400. For example, only messages having a resulting score that satisfies a particular threshold value are kept while the rest are discarded. Alternatively, a fixed number of highest scoring messages are kept, e.g., the top 400 messages.

The second stage 204 of the ranking system 200 includes multiple sub-stages. In the second stage 204, the ranking system 200 further processes the messages output from the first stage 202 by applying more complex ranking models having different and/or increasing numbers of features. In particular, the example ranking system 200 includes a first sub-stage 206, a second sub-stage 208, and an optional third sub-stage 210.

The first sub-stage 206 scores the messages input from the first stage 202 using a model with additional and/or different features to further reduce the set of messages. For example, for 400 input messages from the first stage 202, the first sub-stage 206 can reduce the number to 100 messages, e.g., the top 100 messages by score value.

More specifically, in some implementations the first sub-stage 206 a multi-layer perceptron (MLP) neural network model. An MLP neural network contains a number of layers of nodes including an input layer, and output layer, and one or more hidden layers.

The MLP neural network model can use the same features of stage 1, and in some implementations, introduces additional features. The input messages are re-scored according to the more sophisticated neural network model. As a result, the score for each message from the first sub-stage 206 can be different from the score generated by the first stage 202. The output messages of the first sub-stage 206, e.g., 100 messages, are input to the second sub-stage 208. The second sub-stage 208 applies a model of further complexity to re-score the input messages. Based on the scores of the messages, a final set of messages responsive to the search query are determined, e.g., by ordering the messages by score to generate a ranked set of messages. One or more of the messages can be identified in search results based on the ranked ordering.

Specifically, the second sub-stage 208 can be a neural network having text embedding vectors generated from the search query and the messages output from the first sub-stage 206 as inputs. Text embedding is a technique that transforms text into a numerical vector that represents the semantic information of the text. Text embeddings model the relationship between words in a context, e.g., message text.

For example, a given message can include a string of text. The string of text is converted into a vector in multi-dimensional space. This vector can then be input to the neural network as a feature. Using the text embeddings as a model feature allows the model to identify the similarity of two texts and to infer relevance between them. Because the full text of the messages is represented, the processing requirements are large. However, by placing the text embedding at the later stage of the ranking system 200, the use of text embedding can be limited to a small set of messages.

The second stage includes an optional third sub-stage 210. Without the third sub-stage 210, the output messages of the second sub-stage are used to provide the search results for the search query. The number of output messages can again be a fixed number, e.g., top 20 scoring messages, or can be based on a threshold score value. The messages can be output in score order to provide a ranked set of messages. Alternatively, in some implementations, the output messages are provided to a separate ranking module that orders the messages based on their respective scores.

The optional third sub-stage 210 also uses word embeddings of the query and the message text to calculate a relevance score. This particular score can be used as a boost factor for the scores of the messages output from the second sub-stage 208. In particular, the score generated by the third sub-stage 201 is a measure of whether the words of the messages are used in the same way as the words of the search query. For example, the search term "cat" can mean the animal, but a message including "cat" could also refer to "central African time." Identifying the context of the respective texts can be used to boost messages having a matching context or that are using words in the same sense as the search query.

The third sub-stage can also be a neural network model. However, the model can be trained toward a different objective. In particular, instead of scoring based on an engagement objective, the model of the third sub-stage scores based on relevance between the query and the tweet. The training data for the third sub-stage has different labels, for example, through human annotations or other techniques that relate the relevance to a given query to message text.

The final set of messages can be output from the third sub-stage 210 in a similar manner as described above with respect to the second sub-stage 208 for use in providing search results responsive to the query to the client device.

Although the first, second, and third sub-stages are illustrated in FIG. 2 as parts of a single second stage of the ranking system, one or more of the sub-stages can be configured as separate stages of the ranking system or two or more sub-stages can be combined as a single stage or sub-stage.

Figure 3:
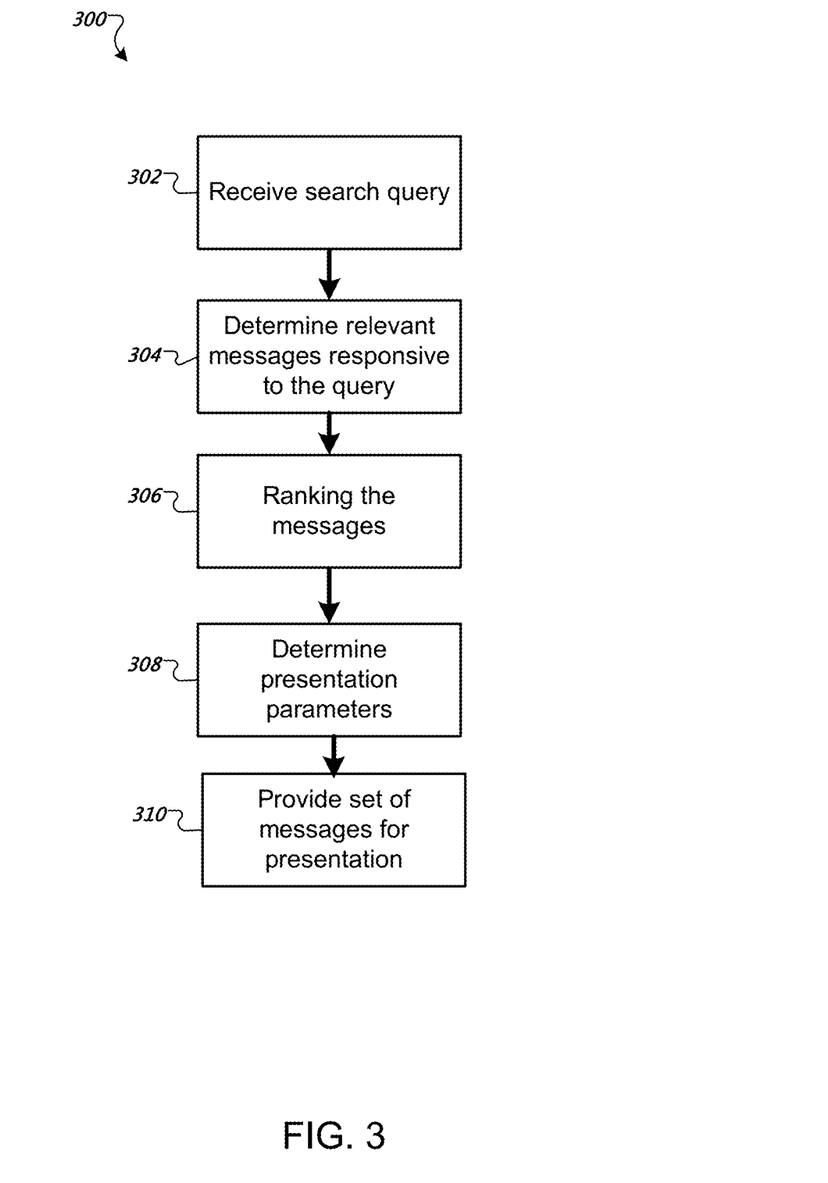
FIG. 3 is a flow diagram of an example method for generating search results.

FIG. 3 is a flow diagram of an example method 300 for generating search results. For convenience, the method 300 will be described with respect to a system that performs the method 300, for example messaging system 100 of FIG. 1.

The system receives a search query (302). The search query can be received from a client device, for example, in response to input by a particular user of the client device. The client device can be a computer or mobile device. The query can be input to a search interface with the messaging system, for example, a web based interface presented on the client device using a browser application or a search field of a stand-alone messaging service application. The search query can include one or more terms that can relate, for example, to particular people, events, or topics. In particular, the search query can be a request for particular messages broadcast using the messaging system that are relevant to the search query.

The system determines messages responsive to the search query (304). Determining messages responsive to the search query includes retrieving a set of messages from a message repository and using a ranking system to generate search results including a set of ranked messages responsive to the search query (306). The ranking system can be a multi-stage ranking system as described above with respect to FIG. 2.

The system determines presentation parameters for the responsive message (308). The presentation parameters can include particular layouts and pagination for the messages in a results interface as well as any particular presentation adjustments. Presentation adjustments are described in more detail with respect to FIGS. 6-7.

The system provides the search results to the client device for presentation according to the determined presentation parameters (310). For example, the system can provide instructions for presenting the search results according to the defined presentation parameters.

Figure 4:
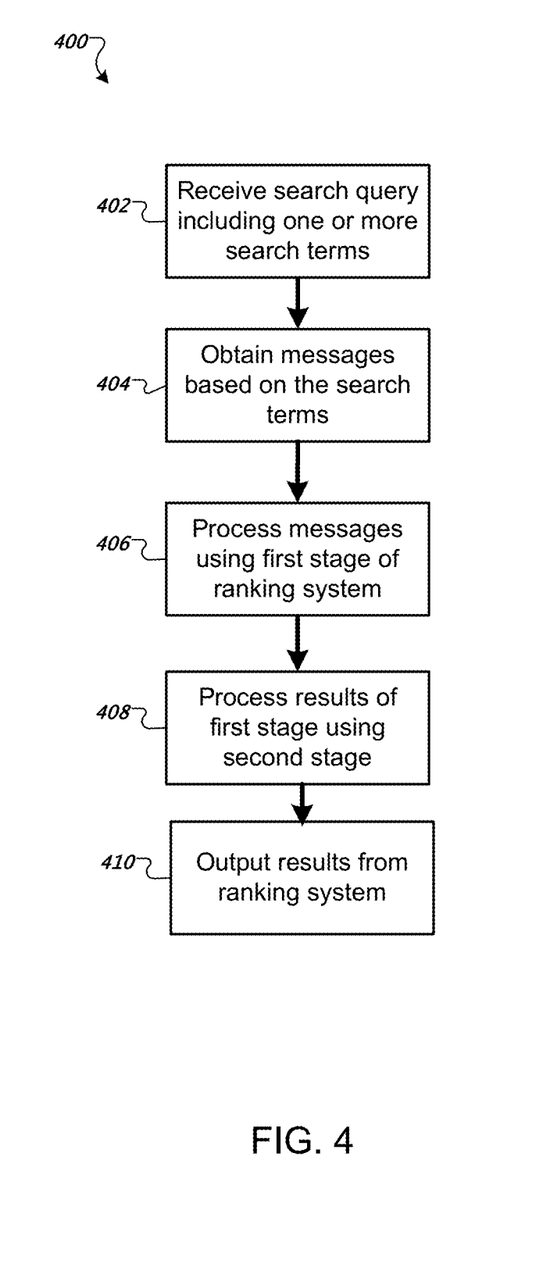
FIG. 4 is a flow diagram of an example method for using a multi-stage ranking system to identify relevant results.

FIG. 4 is a flow diagram of an example method 400 for using a multi-stage ranking system to identify relevant results. For convenience, the method 400 will be described with respect to a system that performs the method 400, for example the multi-stage ranking system 200 of FIG. 2.

The ranking system receives search query terms (402). The ranking system can received the search query from the messaging system in response to a user submission of a search query at a client device.

The ranking system obtains messages based on the search terms (404). In some implementations, the ranking system queries a message repository, e.g., message repository 140 of FIG. 1, for messages having text including the search terms. The search can be based reverse chronological order such that more recent messages are identified up to a specified stopping point, e.g., a maximum number of matching messages. In some implementations, retrieval of messages from the message repository is based on a text based matching that identifies messages that satisfy a threshold degree of match to the terms of the search query.

The system processes the obtained messages using a first stage (406). As described above with respect to FIG. 3, the first stage can include one or more models that can quickly assess the obtained messages. For example, the first stage can include one or more logistic regression models.

The output of the first stage, for example, a set of messages having a score that exceed a specified threshold value, is provided to a second stage. The second stage processes the set of messages output from the first stage (408). The second stage can use more complex models to re-score the smaller set of messages. The more complex models can include additional features used to reevaluate the messages. For example, the second stage can include two or more sub-stages as described above with respect to FIG. 3.

The output of the second stage, for example, a set of messages having respective scores assigned by the second stage that exceed a specified threshold, is output from the ranking system (410). In particular, the output of the second stage of the ranking system can represent a final set of ranked messages responsive to the search query. The messaging platform can take the output set of messages and provide one or more of them to a client device for presentation.

Figure 5:
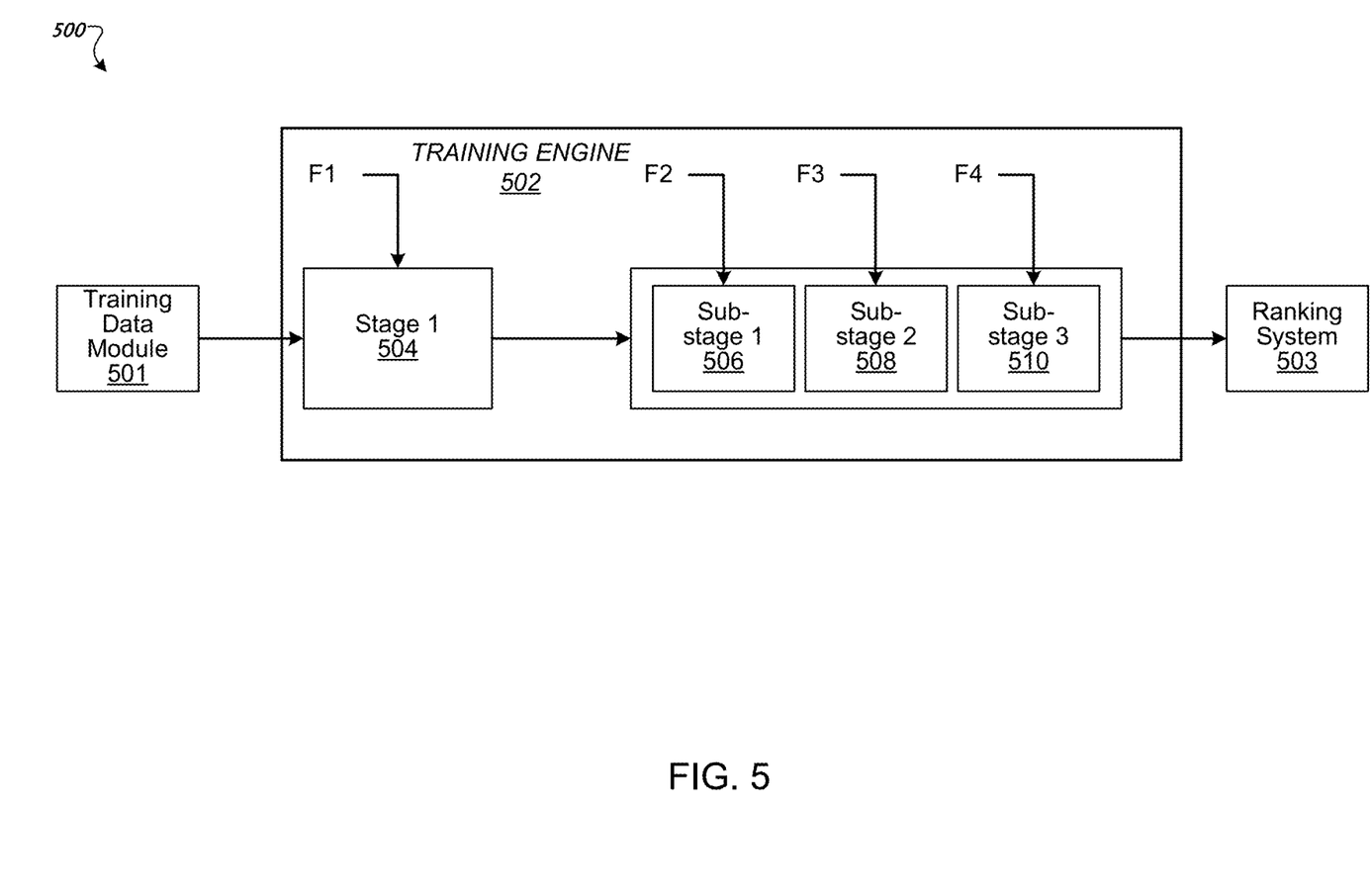
FIG. 5 is a block diagram of an example ranking model training system.

FIG. 5 is a block diagram of an example ranking model training system 500. The training system 500 receives training data from training data module 501, uses the training data in a training engine 502 to train multiple models of a ranking system, and generates models that form a multi-stage ranking system 503.

Each model is trained by the training engine 502 based on the training data and a set of features used by the model to calculate an output score for respective input data, for example, a score for each input message of the messaging system. Each model can be trained using a specific set of features and is designed to calculate scores based on a particular engagement objective with respect to presented search results.

The training data can include historical data from past search sessions. A search session is a sequence of user events, starting with a search, and ended, for example, after user navigates away from search result page or X minutes of inaction. Consequently, the training data can include, for each search session, the initiating query, the search results, and whether or not the user engaged with the search results. The engagements, e.g., social actions or selections, on the results in the session are used to generate training instances for a given search query and message pair.

Generating the training data can require further adjustments. The training data can be subject to domain adaptation. The training data should statistically resemble the actual data, e.g., search queries, that will be input to the ranking system. The models may need to be retrained over time based on evaluation of the actual data as compared to the training data. Additionally, users tend to engage more with messages at higher positions in the ordering of search results, referred to as position bias. The training data module 501 can assign weights to the training data based on position to account for the position bias.

Furthermore, the information on engagements in the training data can be noisy. Many messages receiving small numbers of engagements may not be representative when generalized to a larger audience. To remove some outlier tastes, the training data module 501 calculates a positive ratio of the engagement on a (search query, message) pair. A given engagement example is used if a specified percentage of training instances have positive engagements in the training data.

A number of different types of engagements can be used as training targets for a given model. The types of engagements can include particular social actions associated with particular search result messages, for example, a rebroadcast of the message, a reply to the message, an endorsement of the message, e.g., a like, or a quote of the message. The engagement target can also be a combination of engagements, for example, a combination of all of the above social actions.

The engagement can also be a selection associated with the message, e.g., a user click action to select particular media content of the message such as a video or image, a selection that expands the message, or a selection that requests additional information about the message. The engagement can also be based on the length of user interaction with the message, for example, the user keeping the message in view for longer than a specified threshold amount of time.

Each model has a specific design configured based on the volume of data to process and the speed required. The example, the first stage 504, as noted above, is configured to quickly process a large amount of messages obtained from a message repository. In some instances there are two or more logistic regression models each calculating a message score to a different engagement target. For example, a first logistic regression model can have an engagement objective as any of the above described social actions with respect to a given message while a second logistic regression model can have an engagement objective as indicating how likely a message is to be selected. Thus, each model is individually trained using the training data based on the corresponding engagement objective.

Each model is associated with a set of features. During training, the weights of the features are adjusted to optimize the ability of the model to accurately score the messages of the training data with respect to the engagement objective. Since the training data has known engagements, the model can be evaluated to determine whether the scoring output of the model predicting the engagement agrees with the actual engagement. In some implementations, additional training data can be used to test the accuracy of the trained model.

In some implementations, the features are represented using a unified feature set representation across all of the models used in the ranking system. This unified feature set representation, referred to as a feature schema. The feature schema provides a centralized definition for feature names, types, and other characteristics. For example, the other characteristics can include whether the feature values are discrete or continuous. The same representation of the feature vector is used throughout the training system so that the code or libraries can be shared and that transformation of the data is minimized.

Each stage of the ranking system applies respective models that can use a different set of features. For example, the features used to train the logistic regression models of the first stage 504 can be different than the features used in the models for sub-stages 506, 508, and 510. In some implementations, the number of features used at each stage or sub-stage increases as the ranking system progresses, retrieving more and more features in the later stages. However, it may be necessary to add a feature used by a model of one stage or sub-stage to another. The feature schema representation of the features allows for the interchangeable use of the features between different models of the ranking system.

Various features can be used for the different models, for example:

Static Message Features: static message features about messages that are known at the creation time. These features can include, for example whether the message is a reply to another message, whether the message includes tags, e.g. #hashtags, whether the message identifies one or more other accounts, e.g., @mentions, the language of the message, and the quality of the text. These static message features are basic features, usually binary or discrete.

Dynamic Message Features: Dynamic message features are features about messages that can change after they are created, usually collected through a real-time pipeline, like the number of rebroadcasts, likes, and replies they receive. These usually have continuous values.

Decayed Counters: Decayed counters are counters that take into account when a count event happens, e.g., a reply to a message, and gives a lower weight to older counts.

Weighted counters: Weighted counters are counters that give a different weight to each counting event depending on where his counting event originates from. In some implementations, the system weights the counting by an engaging person's reputation score.

Author Features: Author features are information about the author of the message, like their reputation score, if they are verified or not, etc.

Textual features: these are word embedding vectors computed from the query text and tweet text. They uses deep learning algorithms like Word2Vec to produce an embedding (a vector form) of text tokens and use them in the neural network model for ranking, for example, as used in the second sub-stage 208 of the ranking system 200.

Result Set Features: Result set features are information describing a message's position in a result set, as well as the statistical properties of the result set itself, like the average score.

Searcher Counting Features: A searcher counting feature is an aggregated feature vector about a current searcher based on their past engagement behaving pattern, like how often the user engages with a message having a certain property, like tweets with videos, tweets from the user's networks, etc.

Searcher Context: Searcher context features include other information particular to the time of the query, like the information about the searcher him/herself, current time, the UI language setting of the searcher, etc.

Features are selected for the models of each stage of the ranking system and used in the training. The values for the features are extracted from a particular collection of messages as well as message context. In some implementations, the features are extracted from the messages of the training data.

The particular features used for each model are selected based in part on the processing resources needed to run the model using the feature. For example, some features are large pieces of data, e.g., the message text, or will incur a computationally expensive lookup of some other large piece of data. Because the ranking system needs to generate search results in a time that satisfies latency requirements, some features can only be applied to a smaller number of candidate messages. Thus, those features may be selected for the second stage or even the second sub-stage where the candidate message set has been reduced. Another factor in selecting the particular features for models at a given stage of the ranking system is empirical. If the computing costs are not a concern, the selection can be based off of trying different combinations of features or features at particular stages to determine whether or not performance of the model and/or the ranking system as a whole is improved.

After the training is complete, the resulting ranking system 503 can be validated against other labeled data where the engagements are known. This can test the overall model as well as can be used to check on domain adaptation to the training data.

New features can be added to a particular model or moved from one model to another at a later time and retrained.

Because of the feature schema, features of one model can easily be inserted into another model.

For practical reasons, when introducing a new feature to the first stage, the system may train the feature as part of a second stage model instead because it is less complex to modify and deploy the second stage. The feature can then later be added to the first stage based on the evaluation of the second stage model using the feature.

Figure 6:
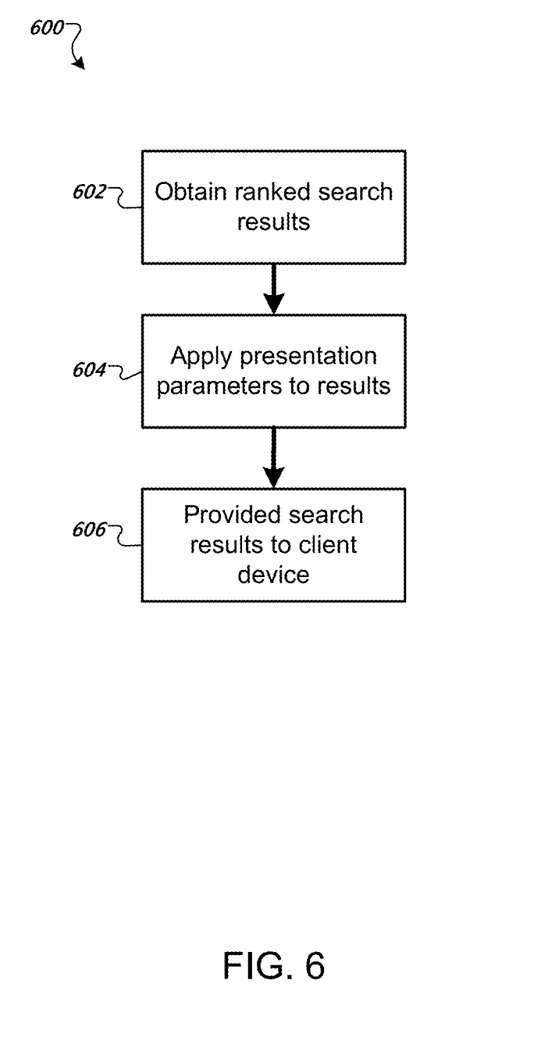
FIG. 6 is a flow diagram of an example method of providing a plurality of search results to a client device.

FIG. 6 is a flow diagram of an example method 600 of providing a plurality of search results to a client device. For convenience, the method 600 will be described with respect to a system that performs the method 600, for example, the message system 100 of FIG. 1.

The system obtains a set of ranked search results representing relevant messages responsive to a query received from a client device (602). For example, the set of ranked search results can be results generated by a ranking system, e.g., the multi-stage ranking system 200 of FIG. 2.

The ranked search results represent a set of highest scoring messages from the ranking system that do not necessarily correspond to a reverse chronological ordering of messages. However, although the messages are the most relevant, additional presentation parameters are applied (604) to balance the search results for presentation.

The search results can include a blend of different results types including user message posts, relevant accounts, news message posts, etc. When too many results are of a particular result type, it may lead to less engagement by a viewing users. Thus, if too many of one type of result are ranked higher it could reduce engagement with other types of results.

The layout of the search results page can be defined by particular presentation parameters that specify how results are displayed on a results page as well as adjustments to individual results. The presentation parameters can specify display of the search page, for example, by defining particular regions for particular results types. In some implementations, relevant accounts are placed in a first region at a top of a results page followed by a second region of user message posts. The relevant accounts can be identified using a separate system that performs a different user search and ranking. In some implementations, an additional component of the search system merges the message results and account results together into a single results page.

In some implementations, the presentation is adjusted to place focus on user message posts. However, the presentation parameters can include score adjustments to the search results so that the user posts do not overpower other result types. In some further implementations, the presentation parameters can include a score adjustment based on an inferred intent of the searching user. For example, if the search query has an inferred intent for a particular type of result, those results can be boosted, e.g., a boost for account results.

The presentation parameters can also be used to adjust result density for a given page of results. For example, user posts with media content, e.g., images or video, can tend to receive more engagements than other posts and be ranked highly. However, this can push non-media user posts further down the search results list, lowering overall engagements. Additionally, user posts with media content are typically expanded such that they are usually much larger than non-media user posts and take up more space on the search results page. Assuming that users have some subconscious limit to their scroll span, this can lead to showing users fewer results overall, causing the users to miss relevant non-media user posts. Similarly, this same point can be applied to a user's attention span with regards to time; users usually take more time to consume media user posts.

Figure 7:
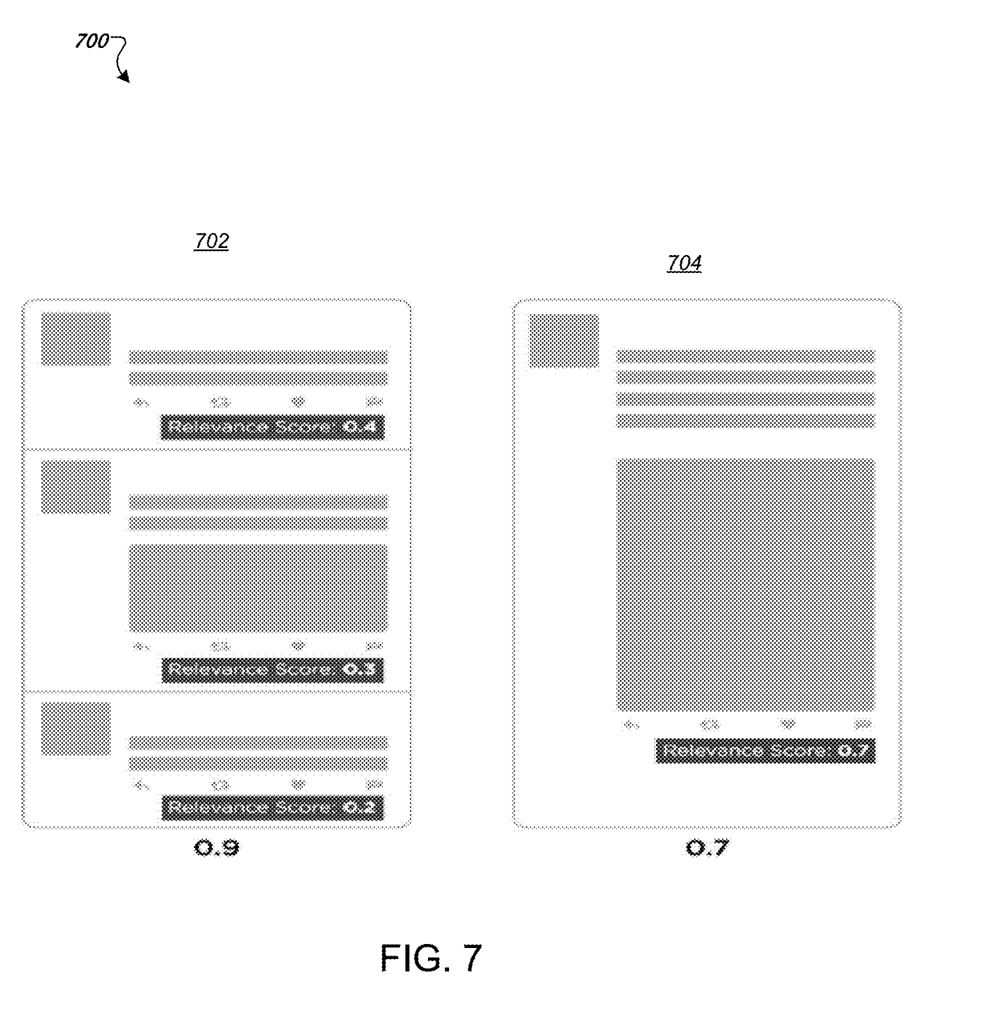
FIG. 7 is an example illustration of relevance density.

To modulate this effect, the presentation parameters can be used to optimize for the sum of relevance scores per page of search results, referred to as relevance density. FIG. 7 is an example illustration 700 of relevance density. The illustration 700 includes a first example results page 702 and a second example results page 704. In the first example results page 702, there are three search results shown with corresponding relevance scores. Similarly, the second example results 704 page shows a single media post and the corresponding relevance score. Although the media post has the highest individual relevance score, the three user posts of the first search results page 702 has the highest sum of relevance scores on a per page basis.

Further optimization can be based not just on the sum of the individual relevance scores but also on how the search result posts relate to each other. For example, the system should not present results with many user posts having the same video or from the same author. Instead, the search results should properly capture various attributes about the query and account for the interests of the overall population.

The system provides the set of results defined by the presentation parameters to the client device for presentation, e.g., on a display of the client (606). The client device then presents one or more search results. For example, a browser application or messaging application can process the received results data to render a corresponding presentation on the client device.

In some alternative implementations the presentation of the search results can include a different layout. For example, different modules can be injected into the search results page that allows for the presentation of search results that balance different aspects of the content. For example, the different types of modules can depend on the nature of the query, the context of the searching user, and the availability of the content. For example, the query text can be used to perform classification that may indicate that a query keyword is a username, e.g., an @name. This could result in a module to include that presents messages from that account. Other types of modules could surface aspects such as messages in the search results that are near the user's location or near a specified location or messages from accounts with which the user has a specified graph relationship.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a messaging system that includes at least one processor and at least one memory, a search query from a user device associated with a particular user account of the messaging system;
   determining one or more relevant messages of the messaging system responsive to the search query, the determining comprising:
      retrieving messages from a message repository of the messaging system that have one or more terms of the query,
      processing the search query using a first stage of a ranking system, the first stage using a first set of features to identify a first set of relevant messages from the retrieved messages, each message of the first set of relevant messages having a score generated by the first stage that satisfies a threshold value, wherein the first stage includes one or more models each trained to score each message according to a prediction of a particular engagement by the user account with the message,
      processing the search query using a second stage of the ranking system, the second stage using a second set of features, the first set of relevant messages, and their corresponding scores to determine a second set of relevant messages, wherein the second stage rescores the first set of relevant messages using two or more models, and wherein each message of the second set of relevant messages has a score generated by the second stage that satisfies a threshold value, and
      ranking the second set of relevant messages according to the respective scores generated by the second stage; and
   providing a response to the search query, wherein the response includes a preset amount of highest ranked messages among the second set of relevant messages.

2. The method of claim 1, wherein processing the search query using the second stage comprises serially processing the search query using a first sub-stage and a second sub-stage, and wherein each sub-stage corresponds to a respective model.

3. The method of claim 2, wherein the first sub-stage is a neural network model using an expanded set of features as compared to the first stage, and wherein the second sub-stage is a neural network model using text embeddings as added features.

4. The method of claim 1, wherein the second stage further comprises a third sub-stage configured to perform operations comprising:
   obtaining word embeddings of respective texts of messages in the second set of relevant messages and obtaining a word embedding of the search query, wherein each word embedding is a vector in a multi-dimensional space;
   using the word embeddings of the texts of messages in the second set of relevant messages and the word embedding of the search query to calculate a respective relevance score between the search query and each message in the second set of relevant messages, wherein the relevance scores generated by the third sub-stage is a measure of whether words of the respective messages are used in a same way as words of the search query; and
   using the relevance scores as a boost factor for the scores generated by the second stage for messages in the second set of relevant messages.

5. The method of claim 1, wherein the first stage includes one or more distinct logistic regression models each trained to identify messages responsive to the query based on an objective of the particular engagement.

6. The method of claim 1, wherein processing the search query using the second stage includes receiving a feature vector identifying features used in the first stage, and wherein the second stage introduces one or more features not used in the first stage.

7. The method of claim 6, wherein each feature shares a particular feature schema allowing features of one model to be added to another model.

8. The method of claim 1, wherein one or more scores of the ranked second set of relevant messages are adjusted based on specified presentation parameters that specify a manner in which the preset amount of highest ranked messages are provided, wherein the preset amount of highest ranked messages are displayed on one or more pages of the user device, wherein the scores are adjusted to optimize a sum of scores for messages displayed on a single page of the user device.

9. A system comprising one or more computers and one or more storage devices storing instructions that are operable, when executed by the one or more computers, to cause the one or more computers to perform operations comprising:
   receiving, at a messaging system, a search query from a user device associated with a particular user account of the messaging system;
   determining one or more relevant messages responsive to the search query, the determining comprising:
      retrieving messages from a message repository of the messaging system that have one or more terms of the query, processing the search query using a first stage of a ranking system, the first stage using a first set of features to identify a first set of relevant messages from the retrieved messages, each message of the first set of relevant messages having a score generated by the first stage that satisfies a threshold value, wherein the first stage includes one or more models each trained to score each message according to a prediction of a particular engagement by the user account with the message, processing the search query using a second stage of the ranking system, the second stage using a second set of features, the first set of relevant messages, and their corresponding scores to determine a second set of relevant messages, wherein the second stage rescores the first set of relevant messages using two or more models, and wherein each message of the second set of relevant messages has a score generated by the second stage that satisfies a threshold value, and ranking the second set of relevant messages according to the respective scores generated by the second stage; and providing a response to the search query, wherein the response includes a preset amount of highest ranked messages among the second set of relevant messages.

10. The system of claim 9, wherein processing the search query using the second stage comprises serially processing the search query using a first sub-stage and a second sub-stage, wherein each sub-stage corresponds to a respective model.

11. The system of claim 10, wherein the first sub-stage is a neural network model using an expanded set of features as compared to the first stage, and wherein the second sub-stage is a neural network model using text embeddings as added features.

12. The system of claim 9, wherein the second stage further comprises a third sub-stage configured to perform operations comprising:

obtaining word embeddings of respective texts of messages in the second set of relevant messages and obtaining a word embedding of the search query, wherein each word embedding is a vector in a multi-dimensional space;

using the word embeddings of the texts of messages in the second set of relevant messages and the word embedding of the search query to calculate a respective relevance score between the search query and each message in the second set of relevant messages, wherein the relevance scores generated by the third sub-stage is a measure of whether words of the respective messages are used in a same way as words of the search query; and using the relevance scores as a boost factor for the scores generated by the second stage for messages in the second set of relevant messages.

13. The system of claim 9, wherein the first stage includes one or more distinct logistic regression models each trained to identify messages responsive to the query based on an objective of the particular engagement.

14. The system of claim 9, wherein processing the search query using the second stage includes receiving a feature vector identifying features used in the first stage, and wherein the second stage introduces one or more features not used in the first stage.

15. The system of claim 14, wherein each feature shares a particular feature schema allowing features of one model to be added to another model.

16. The system of claim 9, wherein one or more scores of the ranked second set of relevant messages are adjusted based on specified presentation parameters that specify a manner in which the preset amount of highest ranked messages are provided, wherein the preset amount of highest ranked messages are displayed on one or more pages of the user device, wherein the scores are adjusted to optimize a sum of scores for messages displayed on a single page of the user device.

17. One or more non-transitory computer-readable storage media encoded with instructions that, when executed by one or more computers, cause the one or more computers to perform operations comprising:

receiving, at a messaging system, a search query from a user device associated with a particular user account of the messaging system;

determining one or more relevant messages responsive to the search query, the determining comprising:

retrieving messages from a message repository of the messaging system that have one or more terms of the query, processing the search query using a first stage of a ranking system, the first stage using a first set of features to identify a first set of relevant messages from the retrieved messages, each message of the first set of relevant messages having a score generated by the first stage that satisfies a threshold value, wherein the first stage includes one or more models each trained to score each message according to a prediction of a particular engagement by the user account with the message, processing the search query using a second stage of the ranking system, the second stage using a second set of features, the first set of relevant messages, and their corresponding scores to determine a second set of relevant messages, wherein the second stage rescores the first set of relevant messages using two or more models to, and wherein each message of the second set of relevant messages has a score generated by the second stage that satisfies a threshold value, and ranking the second set of relevant messages according to the respective scores generated by the second stage; and providing a response to the search query, wherein the response includes a preset amount of highest ranked messages among the second set of relevant messages.

18. The one or more computer-readable storage media of claim 17, wherein processing the search query using the second stage comprises serially processing the search query using a first sub-stage and a second sub-stage, and wherein each sub-stage corresponds to a respective model.

19. The one or more computer-readable storage media of claim 18, wherein the first sub-stage is a neural network model using an expanded set of features as compared to the first stage, and wherein the second sub-stage is a neural network model using text embeddings as added features.

20. The one or more computer-readable storage media of claim 17, wherein the second stage further comprises a third sub-stage configured to perform operations comprising:

obtaining word embeddings of respective texts of messages in the second set of relevant messages and obtaining a word embedding of the search query, wherein each word embedding is a vector in a multi-dimensional space;

using the word embeddings of the texts of messages in the second set of relevant messages and the word embedding of the search query to calculate a respective relevance score between the search query and each message in the second set of relevant messages, wherein the relevance scores generated by the third sub-stage is a measure of whether words of the respective messages are used in a same way as words of the search query; and using the relevance scores as a boost factor for the scores generated by the second stage for messages in the second set of relevant messages.

21. The one or more computer-readable storage media of claim 17, wherein the first stage includes one or more distinct logistic regression models each trained to identify messages responsive to the query based on an objective fo the particular engagement.

22. The one or more computer-readable storage media of claim 17, wherein processing the search query using the second stage includes receiving a feature vector identifying features used in the first stage, and wherein the second stage introduces one or more features not used in the first stage.

23. The one or more computer-readable storage media of claim 22, wherein each feature shares a particular feature schema allowing features of one model to be added to another model.

24. The one or more computer-readable storage media of claim 17, wherein one or more scores of the ranked second set of relevant messages are adjusted based on specified presentation parameters that specify a manner in which the preset amont of highest ranked messages are provided, wheein the preset amount of highest ranked messages are displayed on one or more pages of the user device, wherein the scores are adjusted to optimize a sum of scores for messages displayed on a single page of the user device.

* * * * *

UNITED STATES PATENT AND TRADEMARK OFFICE
CERTIFICATE OF CORRECTION

PATENT NO. : 11,003,720 B1
APPLICATION NO. : 15/836775
DATED : May 11, 2021
INVENTOR(S) : Yan Xia, Tian Wang and Juan Manuel Caicedo Carvajal Page 1 of 1

It is certified that error appears in the above-identified patent and that said Letters Patent is hereby corrected as shown below:

On the Title Page

Item (72) Inventors:, delete "Manual" and insert -- Manuel --, therefor.

In the Claims

Column 18, Line 43, Claim 17, delete "models to" and insert -- models --, therefor.

Column 19, Line 19, Claim 21, delete "fo" and insert -- of --, therefor.

Column 20, Line 14, Claim 24, delete "amont" and insert -- amount --, therefor.

Column 20, Line 15, Claim 24, delete "wheein" and insert -- wherein --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*